US011509216B2

(12) United States Patent
Sato et al.

(10) Patent No.: US 11,509,216 B2
(45) Date of Patent: Nov. 22, 2022

(54) SEMICONDUCTOR DEVICE FOR NON-ISOLATED BUCK CONVERTER, NON-ISOLATED BUCK CONVERTER, AND POWER SUPPLY DEVICE

(71) Applicant: ROHM Co., LTD., Kyoto (JP)

(72) Inventors: Yoshinori Sato, Kyoto (JP); Satoru Nate, Kyoto (JP); Yifei Tang, Kyoto (JP)

(73) Assignee: ROHM CO., LTD., Kyoto (JP)

(*) Notice: Subject to any disclaimer, the term of this patent is extended or adjusted under 35 U.S.C. 154(b) by 62 days.

(21) Appl. No.: 17/083,657

(22) Filed: Oct. 29, 2020

(65) Prior Publication Data

US 2021/0135594 A1     May 6, 2021

(30) Foreign Application Priority Data

Oct. 30, 2019 (JP) .............................. JP2019-197291

(51) Int. Cl.
*H02M 3/156* (2006.01)
*H02M 1/36* (2007.01)
*H02M 1/32* (2007.01)
*H02M 1/00* (2006.01)

(52) U.S. Cl.
CPC ......... *H02M 3/156* (2013.01); *H02M 1/0022* (2021.05); *H02M 1/32* (2013.01); *H02M 1/36* (2013.01)

(58) Field of Classification Search
CPC .......... H02M 3/156; H02M 7/04; H02M 7/06; H02M 1/0016; H02M 1/0022; H02M 1/32; H02M 1/36

See application file for complete search history.

(56) References Cited

U.S. PATENT DOCUMENTS

| 2010/0201283 A1* | 8/2010 | Kawata | ..................... G05F 3/08 |
| | | | 315/287 |
| 2011/0057634 A1* | 3/2011 | Kunimatsu | ........... H02M 3/156 |
| | | | 323/282 |
| 2011/0095733 A1* | 4/2011 | Park | .................... H02M 1/4225 |
| | | | 323/207 |

(Continued)

FOREIGN PATENT DOCUMENTS

JP     2015106439     6/2015

*Primary Examiner* — Gustavo A Rosario-Benitez
(74) *Attorney, Agent, or Firm* — Chip Law Group

(57) ABSTRACT

A non-isolated buck converter generates an output voltage by stepping down an input voltage obtained by subjecting an alternating-current voltage to full-wave rectification and smoothing, by using a step-down circuit including a switching element, an inductor, and a freewheeling diode. The switching element is disposed between a first terminal and a second terminal. A semiconductor device in charge of switching control operates with a potential at the second terminal as a reference. A control circuit provided in the semiconductor device includes a protecting circuit capable of referring to an evaluation voltage corresponding to a voltage between the first terminal and the second terminal at a sampling timing at which a predetermined period of time has passed from turning off of the switching element, and performing a protecting operation that fixes the switching element to an off state on the basis of the evaluation voltage.

11 Claims, 7 Drawing Sheets

(56) References Cited

U.S. PATENT DOCUMENTS

| | | | |
|---|---|---|---|
| 2014/0313626 A1* | 10/2014 | Wang | H02H 9/04 361/91.2 |
| 2016/0033981 A1* | 2/2016 | Harada | G05F 1/468 323/265 |
| 2016/0069938 A1* | 3/2016 | Wu | H02M 7/217 361/18 |
| 2016/0105096 A1* | 4/2016 | Chen | H02M 1/4225 323/210 |
| 2017/0040883 A1* | 2/2017 | Hu | H02M 1/32 |
| 2018/0020507 A1* | 1/2018 | Liu | H05B 6/06 |
| 2018/0166989 A1* | 6/2018 | Oyama | H02M 1/36 |

* cited by examiner

★: SAMPLING TIMING

SEMICONDUCTOR DEVICE FOR NON-ISOLATED BUCK CONVERTER, NON-ISOLATED BUCK CONVERTER, AND POWER SUPPLY DEVICE

CROSS REFERENCE TO RELATED APPLICATIONS

This application claims priority benefit of Japanese Patent Application No. JP 2019-197291 filed in the Japan Patent Office on Oct. 30, 2019. Each of the above-referenced applications is hereby incorporated herein by reference in its entirety.

BACKGROUND

The present disclosure relates to a semiconductor device for a non-isolated buck converter, a non-isolated buck converter, and a power supply device.

A non-isolated buck converter may be used in applications in which an alternating current/direct current (AC/DC) converter does not need insulation.

An example of the related art is disclosed in Japanese Patent Laid-Open No. 2015-106439.

SUMMARY

FIG. 12 illustrates a reference configuration of a power supply device 900 as an AC/DC converter including a non-isolated buck converter. In the power supply device 900, an input voltage Vi obtained by subjecting an alternating-current voltage Vac to noise reduction, full-wave rectification, and smoothing is input to a non-isolated buck converter 910. An output voltage Vo is obtained by stepping down the input voltage Vi in the non-isolated buck converter 910. The non-isolated buck converter 910 is provided with a semiconductor device 920 (semiconductor integrated circuit) that controls switching for the step-down. A ground of the input voltage Vi and the output voltage Vo and a ground of the semiconductor device 920 have potentials different from each other.

The non-isolated buck converter 910 is designed on a premise that the magnitude of the alternating-current voltage Vac falls within a predetermined range. Thus, it is desirable to incorporate a protecting function that stops switching when the alternating-current voltage Vac is too low (hence, when the input voltage Vin is too low) or when the alternating-current voltage Vac is too high (hence, when the input voltage Vin is too high).

However, the semiconductor device 920 operates with the ground different from the ground of the input voltage Vi and the output voltage Vo, as a reference. Therefore, it is difficult for the semiconductor device 920 to detect the magnitude of the alternating-current voltage Vac (magnitude of the input voltage Vi). As a result, a protecting function as described above is difficult to be incorporated.

Incidentally, while description has been made of circumstances related to the non-isolated buck converter with attention directed to the AC/DC converter, there are similar circumstances also in a case where the input voltage Vi is supplied from a direct-current voltage source such as a battery.

It is desirable to provide a semiconductor device for a non-isolated buck converter, a non-isolated buck converter, and a power supply device that can perform a protecting operation in response to an inappropriate input voltage.

According to an embodiment of the present disclosure, there is provided a semiconductor device for a non-isolated buck converter, the semiconductor device including: a first terminal connected to input wiring to which an input voltage having a first ground potential as a reference is applied; a second terminal connected to one terminal of an inductor; a switching element disposed between the first terminal and the second terminal; and a control circuit configured to control an output voltage in output wiring to which another terminal of the inductor is connected and a smoothing capacitor is connected, by controlling an inductor current flowing through the inductor through switching control of the switching element; the semiconductor device operating with a second ground potential corresponding to a potential of the second terminal as a reference; the smoothing capacitor being disposed between the output wiring and a conductive portion having the first ground potential; the control circuit including a protecting circuit capable of referring to an evaluation voltage corresponding to a voltage between the first terminal and the second terminal at a sampling timing at which a predetermined period of time has passed from turning off of the switching element, and performing a protecting operation that fixes the switching element to an off state on the basis of the evaluation voltage (first configuration).

In the semiconductor device for a non-isolated buck converter according to the foregoing first configuration, the inductor current may flow through the switching element in an on interval of the switching element, and the non-isolated buck converter may include a freewheeling element for guiding the inductor current in an off interval of the switching element to the output wiring (second configuration).

In the semiconductor device for a non-isolated buck converter according to the foregoing second configuration, part of energy stored in the inductor in the on interval of the switching element may remain in the inductor at the sampling timing (third configuration).

In the semiconductor device for a non-isolated buck converter according to the foregoing second configuration, the inductor current produced in the on interval of the switching element may remain at the sampling timing (fourth configuration).

In the semiconductor device for a non-isolated buck converter according to any one of the foregoing first to fourth configurations, the protecting circuit may refer to the evaluation voltage each time the switching element is turned off and perform the protecting operation when a low voltage state in which the evaluation voltage is below a predetermined lower side determination voltage continues for a predetermined period of lower side determination time or more (fifth configuration).

In the semiconductor device for a non-isolated buck converter according to any one of the foregoing first to fifth configurations, the protecting circuit may refer to the evaluation voltage each time the switching element is turned off and perform the protecting operation when an overvoltage state in which the evaluation voltage exceeds a predetermined upper side determination voltage continues for a predetermined period of upper side determination time or more (sixth configuration).

In the semiconductor device for a non-isolated buck converter according to any one of the foregoing first to sixth configurations, the protecting circuit may include a voltage dividing circuit that divides the input voltage with the second ground potential as a reference, the evaluation voltage may be obtained through voltage division in the voltage dividing circuit, the voltage dividing circuit may be integrated on a semiconductor substrate including silicon, and each voltage dividing resistance constituting the voltage dividing circuit may be formed by using the silicon within the semiconductor substrate (seventh configuration).

The semiconductor device for a non-isolated buck converter according to any one of the foregoing first to seventh configurations may further include a starting circuit, the control circuit may be capable of operating on a power supply voltage based on output of the starting circuit or based on the output voltage from the output wiring and may stop operating in a reset state in which the power supply voltage is below a predetermined reset voltage, the starting circuit may start the control circuit by raising the power supply voltage on the basis of the input voltage in the first terminal with the reset state as a starting point, and the power supply voltage may be generated on the basis of the output voltage after the control circuit is started (eighth configuration).

In the semiconductor device for a non-isolated buck converter according to the foregoing eighth configuration, the protecting operation may be performed with a state in which the power supply voltage is generated on the basis of the output voltage after the starting of the control circuit as a starting point, when the power supply voltage consequently falls below the reset voltage through a decrease in the output voltage, the protecting operation may be canceled with a stop of the control circuit, and when the starting circuit subsequently raises the power supply voltage, the control circuit may be restarted, and switching of the switching element may be resumed (ninth configuration).

In the semiconductor device for a non-isolated buck converter according to the foregoing eighth configuration, the protecting operation may be performed with a state in which the power supply voltage is generated on the basis of the output voltage after the starting of the control circuit as a starting point, and when the power supply voltage consequently decreases through a decrease in the output voltage, the starting circuit may hold the power supply voltage higher than the reset voltage on the basis of the input voltage at the first terminal, and when a predetermined period of standby time passes from a start of the protecting operation, the control circuit may perform test processing that temporarily switches the switching element against the protecting operation and may continue or cancel the protecting operation of the protecting circuit on the basis of the evaluation voltage in the test processing (tenth configuration).

In the semiconductor device for a non-isolated buck converter according to the foregoing eighth configuration, the protecting operation may be performed with a state in which the power supply voltage is generated on the basis of the output voltage after the starting of the control circuit as a starting point, and when the power supply voltage consequently decreases through a decrease in the output voltage, the starting circuit may hold the power supply voltage higher than the reset voltage on the basis of the input voltage at the first terminal, and when the switching element is fixed to an off state by the protecting operation, the control circuit may refer to a second evaluation voltage corresponding to the voltage between the first terminal and the second terminal, and may continue or cancel the protecting operation of the protecting circuit on the basis of the second evaluation voltage (eleventh configuration).

According to another embodiment of the present disclosure, there is provided a non-isolated buck converter for generating an output voltage having a first ground potential as a reference from an input voltage having the first ground potential as a reference, the non-isolated buck converter including: input wiring to which the input voltage is applied; output wiring to which the output voltage is applied; the semiconductor device (semiconductor device for a non-isolated buck converter) according to any one of the foregoing first to eleventh configurations; an inductor disposed between the output wiring and the second terminal in the semiconductor device; and a smoothing capacitor disposed between the output wiring and a conductive portion having the first ground potential (twelfth configuration).

According to a further embodiment of the present disclosure, there is provided a power supply device including: a rectifying/smoothing circuit configured to subject an alternating-current voltage to full-wave rectification and smoothing; and the non-isolated buck converter according to the foregoing twelfth configuration, the non-isolated buck converter receiving a voltage obtained by the full-wave rectification and the smoothing as an input voltage (thirteenth configuration).

According to the embodiments of the present disclosure, it is possible to provide a semiconductor device for a non-isolated buck converter, a non-isolated buck converter, and a power supply device that can perform a protecting operation in response to an inappropriate input voltage.

DETAILED DESCRIPTION OF THE PREFERRED EMBODIMENT

Figure 1:
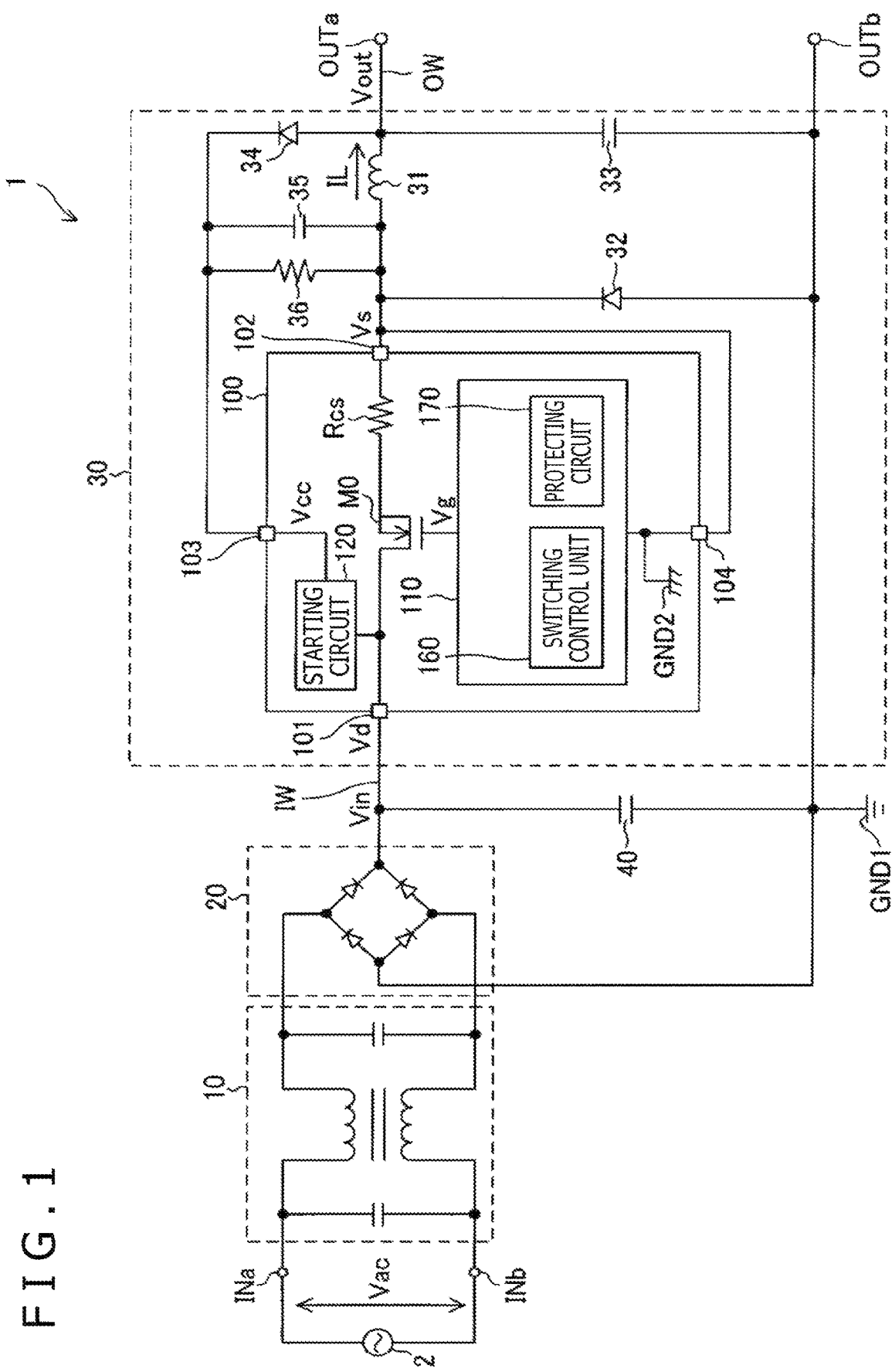
FIG. 1 is a general configuration diagram of a power supply device according to an embodiment of the present disclosure.

An example of an embodiment of the present disclosure will hereinafter be described specifically with reference to the drawings. In the drawings to be referred to, the same parts are identified by the same reference numerals, and repeated description of the same parts will be omitted in principle. Incidentally, in the present specification, for simplification of description, by indicating symbols or reference numerals referring to information, signals, physical quantities, elements, parts, or the like, the names of the information, the signals, the physical quantities, the elements, the parts, or the like corresponding to the symbols or the reference numerals may be omitted or abbreviated. For example, a non-isolated buck converter referred to by "30," which non-isolated buck converter will be described later (see FIG. 1), may be written as a non-isolated buck converter 30, or may be abbreviated to a converter 30. However, the non-isolated buck converter 30 and the converter 30 each refer to the same thing.

Description will first be made of a few terms used to describe the embodiment of the present disclosure. A level refers to a potential level, and for any signal or voltage, a high level has a higher potential than a low level. For any signal or voltage, a state in which the signal or the voltage is at a high level means that the level of the signal or the voltage is a high level, and a state in which the signal or the voltage is at a low level means that the level of the signal or the voltage is a low level. The level of a signal may be expressed as a signal level. The level of a voltage may be expressed as a voltage level.

For a transistor configured as a field-effect transistor (FET) including a MOSFET, an on state refers to a conducting state between a drain and a source of the transistor, and an off state refers to a non-conducting state (interrupted state) between the drain and the source of the transistor. The same is true for transistors not classified as FETs. The MOSFET is an abbreviation of "metal-oxide-semiconductor field-effect transistor." For any transistor, switching from an off state to an on state will be expressed as turn-on, and switching from an on state to an off state will be expressed as turn-off. In addition, for any transistor, an interval in which the transistor is in an on state may be referred to as an on interval, and an interval in which the transistor is in an off state may be referred to as an off interval. In the following, for any transistor, an on state and an off state may also be simply expressed as on and off.

FIG. 1 illustrates a general configuration of a power supply device 1 according to the embodiment of the present disclosure. The power supply device 1 is an AC/DC converter that generates a direct-current output voltage Vout on the basis of an alternating-current voltage Vac supplied from an alternating-current power supply 2. The alternating-current voltage Vac may be a commercial alternating voltage. An effective value of the alternating-current voltage Vac is, for example, 100 V or 200 V.

The power supply device 1 includes alternating-current input terminals INa and INb forming an alternating-current input terminal pair, output terminals OUTa and OUTb forming an output terminal pair, a filter unit 10, a full-wave rectifier circuit 20, a non-isolated buck converter 30, a smoothing capacitor 40, and wiring for connecting elements (including input wiring IW and output wiring OW to be described later).

The alternating-current voltage Vac from the alternating-current power supply 2 is supplied to the alternating-current input terminal pair. That is, the alternating-current voltage Vac from the alternating-current power supply 2 is applied between the alternating-current input terminals INa and INb.

The filter unit 10 is disposed between the alternating-current input terminal pair and the full-wave rectifier circuit 20. The filter unit 10 reduces noise superimposed on the alternating-current voltage Vac. Incidentally, though not particularly illustrated in FIG. 1, a fuse or a surge protecting element may be provided between the alternating-current input terminal pair and the filter unit 10.

The full-wave rectifier circuit 20 is formed by a diode bridge. The full-wave rectifier circuit 20 performs full-wave rectification of the alternating-current voltage Vac subjected to the noise reduction by the filter unit 10. The voltage subjected to the full-wave rectification is smoothed by the smoothing capacitor 40. The full-wave rectifier circuit 20 and the smoothing capacitor 40 constitute a rectifying/smoothing circuit that performs the full-wave rectification and smoothing of the alternating-current voltage Vac.

The voltage obtained by performing the full-wave rectification and smoothing of the alternating-current voltage Vac subjected to the noise reduction by the filter unit 10 will be referred to as an input voltage Vin. The input voltage Vin is applied between a first ground GND1 and the input wiring IW with a potential at the first ground GND1 on a low potential side. The first ground GND1 refers to a conductive portion having a predetermined first ground potential. Hence, a potential higher than the first ground potential by the input voltage Vin is applied to the input wiring IW. One terminal (positive electrode) of the smoothing capacitor 40 is connected to the input wiring IW. Another terminal (cathode) of the smoothing capacitor 40 is connected to the first ground GND1. The input voltage Vin is a positive direct-current voltage. The input voltage Vin can have a pulsating current component with a frequency twice the frequency of the alternating-current voltage Vac. However, in the following, consideration will be given while ignoring such a pulsating current component.

The non-isolated buck converter 30 is a DC/DC converter that generates a direct-current output voltage Vout from the input voltage Vin in a non-isolated form. As with the input voltage Vin, the output voltage Vout is also a positive direct-current voltage having the first ground potential as a reference. However, the output voltage Vout is lower than the input voltage Vin. The output voltage Vout occurs in the output wiring OW. Hence, a potential higher than the first ground potential by the output voltage Vout is applied to the output wiring OW. The output wiring OW is connected to the output terminal OUTa. On the other hand, the output terminal OUTb is connected to the first ground GND1. A load device (not illustrated) driven by the output voltage Vout is connected between the output terminals OUTa and OUTb.

The non-isolated buck converter 30 includes an inductor 31, a freewheeling diode 32, a smoothing capacitor 33, a diode 34, a capacitor 35, a resistance 36, and a semiconductor device 100. The semiconductor device 100 includes a control device of the converter 30.

Figure 2:
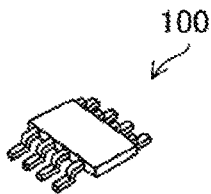
FIG. 2 is an external perspective view of a semiconductor device according to the embodiment of the present disclosure.

The semiconductor device 100 is an electronic part (semiconductor device) formed by sealing a semiconductor integrated circuit within a casing (package) formed by a resin, as illustrated in FIG. 2. The casing of the semiconductor device 100 is provided with a plurality of external terminals in an exposed state. The plurality of external terminals include terminals 101 to 104 illustrated in FIG. 1. Other terminals can also be included in the plurality of external terminals. Incidentally, the number of external terminals of the semiconductor device 100 illustrated in FIG. 2 and the external appearance of the semiconductor device 100 are merely illustrative.

The terminal 101 is connected to the input wiring IW and is supplied with the input voltage Vin. The terminal 102 is connected to one terminal of the inductor 31 and a cathode of the freewheeling diode 32 in a shared manner. Another terminal of the inductor 31 is connected to the output wiring OW (in other words, connected to the output terminal OUTa via the output wiring OW). An anode of the freewheeling diode 32 is connected to the first ground GND1. One terminal (positive electrode) of the smoothing capacitor 33 is connected to the output wiring OW. Another terminal (negative electrode) of the smoothing capacitor 33 is connected to the first ground GND1.

An anode of the diode 34 is connected to the output wiring OW. One terminal of the capacitor 35 and one terminal of the resistance 36 are connected to the terminal 102 in a shared manner. Another terminal of the capacitor 35, another terminal of the resistance 36, and a cathode of the diode 34 are connected to the terminal 103 in a shared manner. The terminals 102 and 104 are connected to each other via wiring provided to an outside of the semiconductor device 100. Each circuit within the semiconductor device 100 operates with a potential at the terminal 104 as a reference. The potential at the terminal 104 will be referred to as a second ground potential. A conductive portion having the second ground potential will be referred to as a second ground GND2. The second ground potential is a potential different from the first ground potential (however, there may occur a timing at which the second ground potential and the first ground potential coincide with each other by chance). The terminal 103 corresponds to a power supply terminal of the semiconductor device 100. A voltage at the terminal 103 will be referred to as a power supply voltage Vcc. The power supply voltage Vcc corresponds to a potential difference between the potential of the terminal 103 and the second ground potential and has a potential higher than the second ground potential.

The semiconductor device 100 includes a transistor M0 configured as an N-channel MOSFET, a sense resistance Rcs, a control circuit 110, and a starting circuit 120.

A drain of the transistor M0 is connected to the terminal 101. A source of the transistor M0 is connected to the terminal 102 via the sense resistance Rcs. The sense resistance Rcs in the semiconductor device 100 may be omitted. The sense resistance Rcs may be provided to the outside of the semiconductor device 100. The control circuit 110 operates on the basis of the power supply voltage Vcc with the second ground potential as a reference. However, the control circuit 110 may operate using a direct-current voltage generated within the semiconductor device 100 on the basis of the power supply voltage Vcc as a driving voltage rather than the power supply voltage Vcc itself. The control circuit 110 controls a state of the transistor M0 by controlling a gate potential Vg of the transistor M0. The control circuit 110 can supply a gate signal at a high level or a low level to a gate of the transistor M0. While the gate signal at the high level is supplied to the gate of the transistor M0, the gate potential Vg of the transistor M0 is at a high level, and the transistor M0 is in an on state. While the gate signal at the low level is supplied to the gate of the transistor M0, the gate potential Vg of the transistor M0 is at a low level, and the transistor M0 is in an off state. The gate signal at the high level has a potential higher than the second ground potential by a predetermined voltage. The predetermined voltage in this case is higher than a gate threshold voltage of the transistor M0. The gate signal at the low level has a potential substantially coinciding with the second ground potential.

A state in which the power supply voltage Vcc is below a predetermined reset voltage Vrst will be referred to as a reset state. A state in which the power supply voltage Vcc exceeds the predetermined reset voltage Vrst will be referred to as a non-reset state. The control circuit 110 stops operation of itself in the reset state. In the reset state, a gate-to-source voltage of the transistor M0 is set at 0 V, and the transistor M0 is thereby maintained in an off state. The control circuit 110 can perform switching control of the transistor M0 in the non-reset state. The switching control of the transistor M0 refers to control for alternately turning on and off the transistor M0. The alternately turning on and off of the transistor M0 itself will be referred to as switching of the transistor M0.

The starting circuit 120 is connected to the terminal 101. The starting circuit 120 can perform a starting charging operation that charges the capacitor 35 connected to the terminal 103 on the basis of the input voltage Vin. This starting charging operation raises the power supply voltage Vcc. Hence, the control circuit 110 can be started by using the starting circuit 120. The starting of the control circuit 110 corresponds to a transition from the reset state to the non-reset state. The starting of the control circuit 110 is also the starting of the converter 30 or the starting of the power supply device 1.

Figure 3:
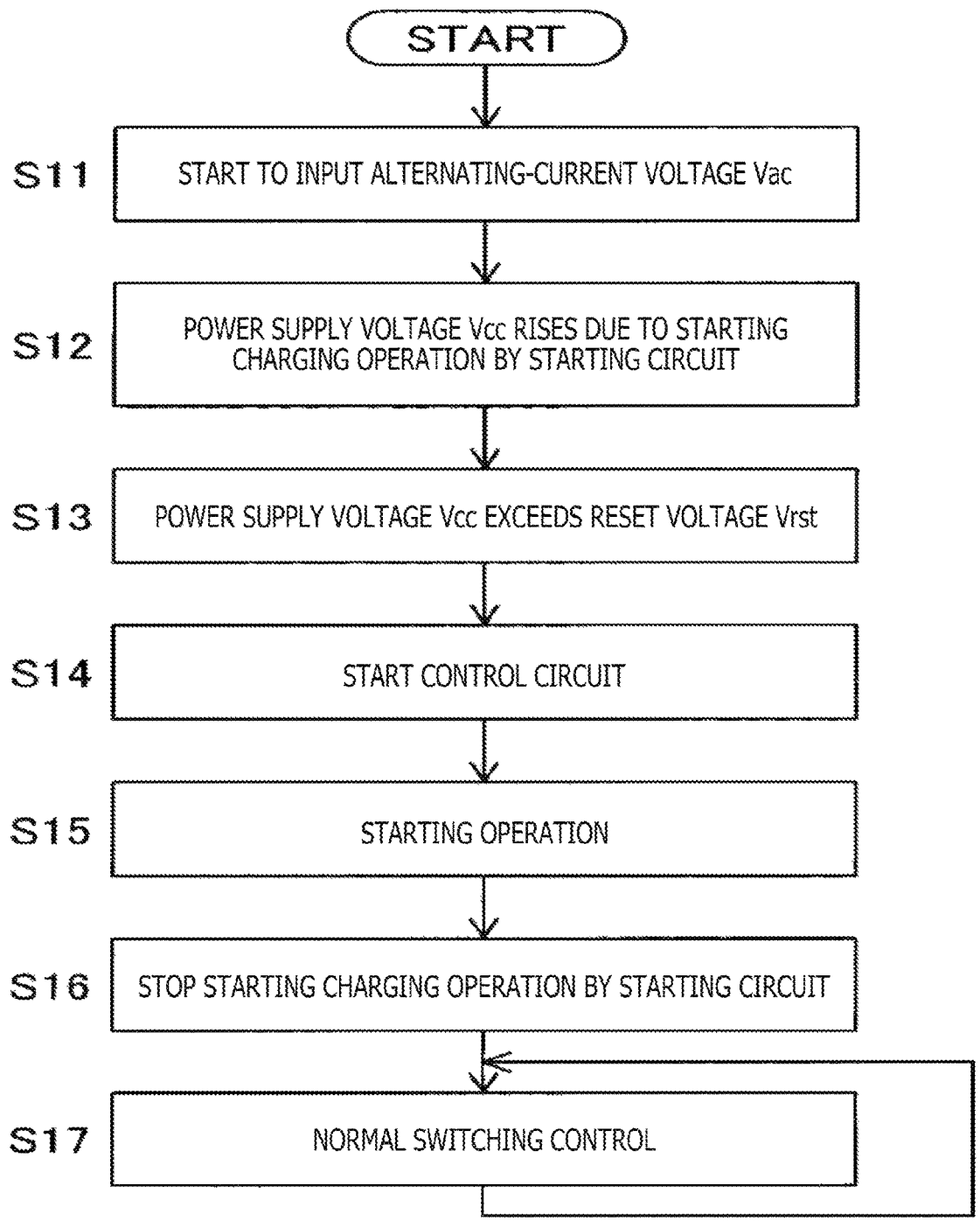
FIG. 3 is a flowchart of an operation of the power supply device according to the embodiment of the present disclosure.

FIG. 3 illustrates a flowchart of an operation of the power supply device 1, in which flowchart attention is directed to an operation related to the starting of the control circuit 110 (in other words, the starting of the converter 30 or the starting of the power supply device 1). With the reset state as a starting point, in step S11, the alternating-current voltage Vac starts to be input to the power supply device 1. Then, the input voltage Vin corresponding to a magnitude of the alternating-current voltage Vac is applied to the input wiring IW. Thus, the power supply voltage Vcc rises when the starting circuit 120 performs the above-described starting charging operation in step S12. When the power supply voltage Vcc exceeds the reset voltage Vrst in step S13 as a result of the starting charging operation of the starting circuit 120, the control circuit 110 is started in step S14 (that is, makes a transition from the reset state to the non-reset state).

When the control circuit 110 is started, the control circuit 110 performs a predetermined starting operation in step S15. In the starting operation, for example, the switching of the transistor M0 at a predetermined pulse width modulation (PWM) frequency is repeatedly performed for a predetermined period of time. At this time, a unit operation in which, after the transistor M0 is turned on in response to a set signal generated at the predetermined PWM frequency, the transistor M0 is turned off when a current flowing through the transistor M0 reaches a predetermined current limit is repeatedly performed for a predetermined period of time. The control circuit 110 can detect the current flowing through the transistor M0 by detecting a voltage drop across the resistance Rcs. Because the transistor M0, the inductor 31, and the freewheeling diode 32 form a step-down circuit, the starting operation involving the switching of the transistor M0 transmits power based on the alternating-current voltage Vac to the output wiring OW and raises the output voltage Vout. Incidentally, details of the starting operation can be changed in any manner as long as the operation of raising the output voltage Vout through the switching of the transistor M0 is performed.

When the starting operation raises the output voltage Vout, a transition is made to a state in which a current flows from the output wiring OW through the diode 34 to the terminal 103 (that is, a state in which the power supply voltage Vcc is generated on the basis of the output voltage Vout). In step S16 reaching this stage, the starting circuit 120 stops the starting charging operation. It suffices for the starting circuit 120 to, for example, stop the starting charging operation in response to the reaching of a predetermined voltage higher than the reset voltage Vrst by the power supply voltage Vcc.

Thereafter, in step S17, the control circuit 110 performs normal switching control. After the normal switching control once starts to be performed, the normal switching control may continue to be performed unless a return is made to the reset state due to alternating-current power interruption or the like, or unless a protecting operation to be described later is performed. When the normal switching control is performed, the power supply voltage Vcc is generated from the output voltage Vout (voltage lower than the output voltage Vout by a forward voltage of the diode 34 becomes the power supply voltage Vcc).

The control circuit 110 has a switching control unit 160 (see FIG. 1) that can perform the normal switching control. In the normal switching control, the transistor M0 is switched (alternately turned on and off) at the predetermined PWM frequency. At this time, the switching control unit 160 controls an on duty of the transistor M0 on the basis of a feedback voltage corresponding to the output voltage Vout. The on duty of the transistor M0 refers to a ratio of an on interval of the transistor M0 to a sum of the on interval of the transistor M0 and an off interval of the transistor M0.

In the configuration example of FIG. 1, stabilization of the output voltage Vout is achieved by feeding back the voltage corresponding to the output voltage Vout to the terminal 103. The capacitor 35 functions so as to maintain the power supply voltage Vcc (potential difference between the terminals 103 and 104) as substantially a direct-current voltage while the normal switching control is performed. Due to the presence of the resistance 36, variations in the output voltage Vout are transmitted to the terminal 103 with a response characteristic corresponding to a capacitance value of the capacitor 35 and a resistance value of the resistance 36.

Figure 4:
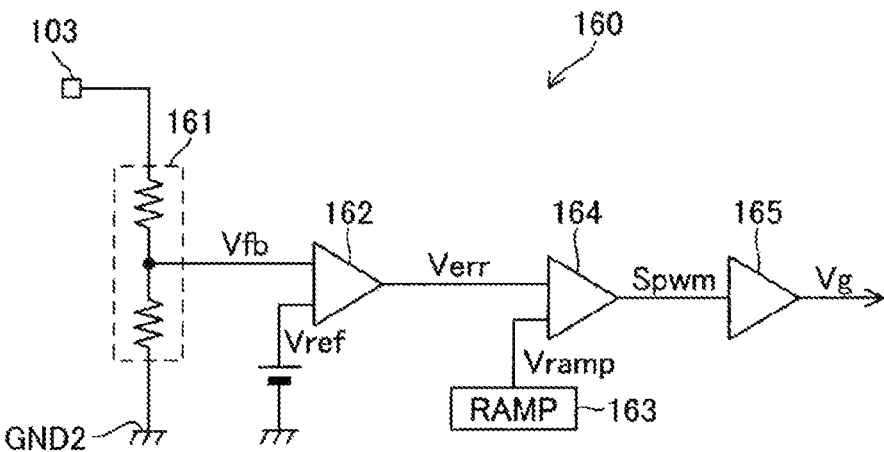
FIG. 4 is a diagram illustrating an example of a configuration of a switching control unit according to the embodiment of the present disclosure.

FIG. 4 illustrates an example of a configuration of the switching control unit 160. The switching control unit 160 of FIG. 4 includes a voltage dividing circuit 161 that generates a feedback voltage Vfb proportional to the power supply voltage Vcc by voltage division of the power supply voltage Vcc, an error amplifier 162 that generates an error voltage Verr corresponding to an error between the feedback voltage Vfb and a predetermined reference voltage Vref, a ramp voltage generating circuit 163 that generates a ramp voltage Vramp in the form of a sawtooth wave or a triangular wave whose voltage value periodically changes at a predetermined PWM frequency, a PWM comparator 164 that generates a signal Spwm as a pulse width modulated signal by comparing the error voltage Verr and the ramp voltage Vramp with each other, and a driver 165 that controls the gate potential Vg of the transistor M0 according to the signal Spwm. The driver 165 switches the transistor M0 at the PWM frequency on the basis of the signal Spwm. The semiconductor device 100 operates on the power supply voltage Vcc (potential difference between the potential of the terminal 103 and the second ground potential) having the second ground potential as a reference. Thus, the feedback voltage Vfb, the error voltage Verr, the ramp voltage Vramp, and the signal Spwm are also a voltage or a signal having the second ground potential as a reference, as with the power supply voltage Vcc.

A current flowing through the inductor 31 will be referred to as an inductor current IL. The inductor current IL flows from the terminal 102 to the output wiring OW. When the transistor M0 is in an on state, the inductor current IL flows from the input wiring IW through the transistor M0 to the output wiring OW. During the on interval of the transistor M0, energy stored in the inductor 31 increases with an increase in the inductor current IL with the passage of time. When the transistor M0 is thereafter turned off, the inductor current IL flows through the freewheeling diode 32 to the output wiring OW on the basis of the energy stored in the inductor 31. During the off interval of the transistor M0, the energy stored in the inductor 31 decreases with a decrease in the inductor current IL with the passage of time. When the energy stored in the inductor 31 is used up, a direct-current component of the inductor current IL becomes zero.

In the normal switching control, the switching control unit 160 adjusts the on duty of the transistor M0 so as to decrease the on duty of the transistor M0 when the feedback voltage Vfb is higher than the reference voltage Vref and so as to increase the on duty of the transistor M0 when the feedback voltage Vfb is lower than the reference voltage Vref. Therefore, the on duty of the transistor M0 is adjusted such that the feedback voltage Vfb coincides with the reference voltage Vref. As a result, in the normal switching control, the output voltage Vout is stabilized as a specific voltage. Incidentally, in the normal switching control, the switching control unit 160 may be able to turn off the transistor M0 irrespective of the signal Spwm in order to protect the transistor M0 and the like from overcurrent when a voltage drop across the sense resistance Rcs reaches a predetermined overcurrent determination voltage.

Thus, the control circuit 110 (switching control unit 160) can control the output voltage Vout by controlling the inductor current IL through the switching control of the transistor M0.

Incidentally, any publicly known configuration different from the configuration of FIG. 1 can also be adopted as the configuration that feeds back the output voltage Vout to the semiconductor device 100.

In addition, the freewheeling diode 32 functions as a freewheeling element that guides the inductor current IL during the off interval of the transistor M0 to the output wiring OW. In the converter 30, a synchronous rectifier transistor may be used as the freewheeling element in place of the freewheeling diode 32. In this case, it suffices to set the synchronous rectifier transistor in an off state when the transistor M0 is in an on state and set the synchronous rectifier transistor in an on state when the transistor M0 is in an off state under control of the control circuit 110 (switching control unit 160).

[Relation Between Drain Potential Vd and Source Potential Vs]

Figure 5:
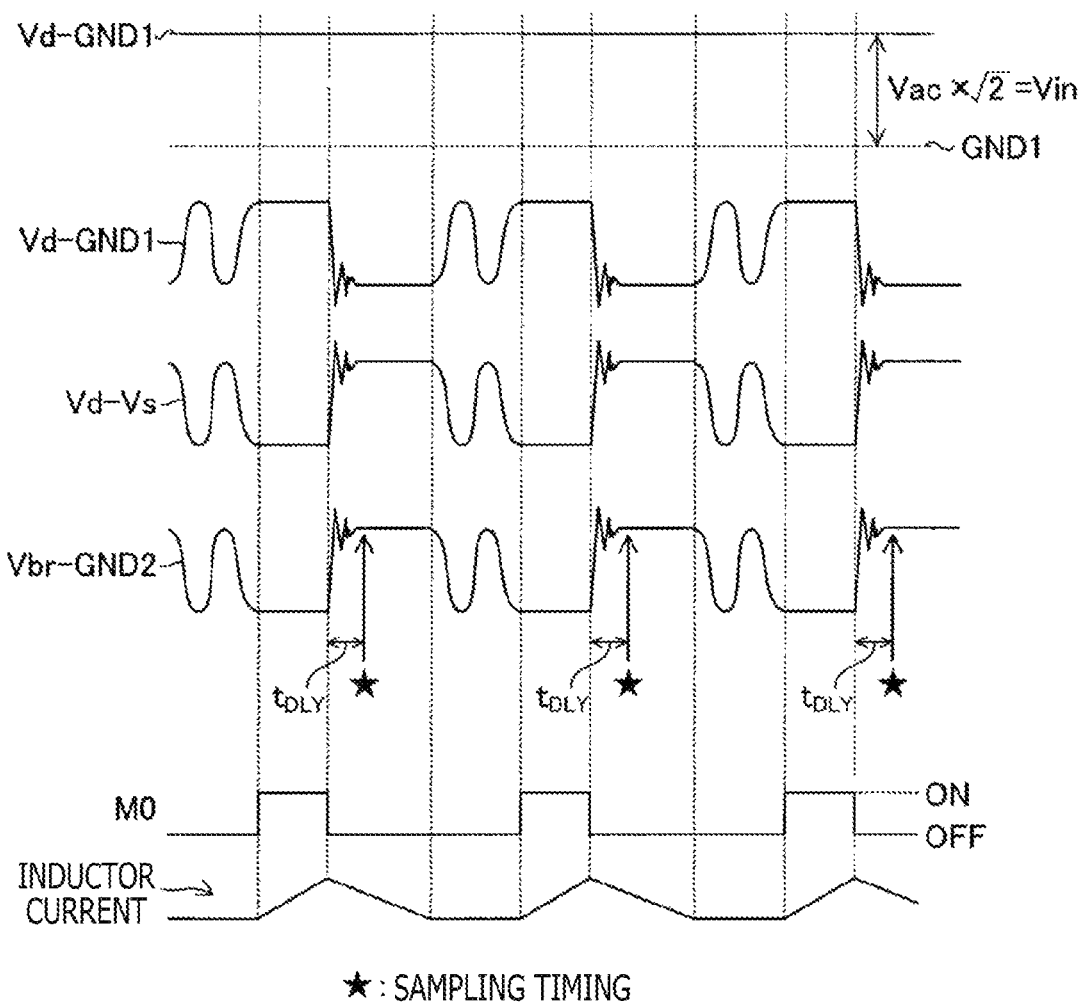
FIG. 5 is a diagram illustrating several voltage waveforms and the like according to the embodiment of the present disclosure.

A potential at the terminal 101 corresponds to a drain potential Vd of the transistor M0. In addition, when a voltage drop across the sense resistance Rcs is considered to be sufficiently low and ignored, a potential at the terminal 102 corresponds to a source potential Vs of the transistor M0. In the following, unless otherwise noted, a resistance value of the sense resistance Rcs and the voltage drop across the sense resistance Rcs will be ignored. The drain potential Vd and the source potential Vs will be considered in relation to the state of the transistor M0 and the presence or absence of energy stored in the inductor 31. FIG. 5 schematically illustrates several voltage waveforms related to the drain potential Vd and the source potential Vs.

Incidentally, in the following description, a symbol "GND1" may be referred to as a symbol representing not only a first ground (conductive portion having the first ground potential) but also the first ground potential, and similarly, a symbol "GND2" may be referred to as a symbol representing not only a second ground (conductive portion having the second ground potential) but also the second ground potential.

In relation to the state of the transistor M0 and the presence or absence of energy stored in the inductor 31, there are following three states $ST_{OFF+}$, $ST_{OFF0}$, and $ST_{ON}$.

The state $ST_{OFF+}$ is a state in which the transistor M0 is in an off state and energy is stored in the inductor 31.

The state $ST_{OFF0}$ is a state in which the transistor M0 is in an off state and no energy is stored in the inductor 31.

The state $ST_{ON}$ is a state in which the transistor M0 is in an on state.

Drain Potential Vd

First, the drain potential Vd has a direct-current potential higher by "Vac×√2" as viewed from the first ground potential GND1 in any of the states $ST_{OFF+}$, $ST_{OFF0}$, and $ST_{ON}$ (see FIG. 5). Represented by "Vac×√2" is a product of the effective value of the alternating-current voltage Vac and a positive square root of two; "Vac×√2" is equal to the input voltage Vin. Incidentally, for simplification, a voltage drop occurring across the full-wave rectifier circuit 20 is ignored here.

Source Potential Vs

The source potential Vs as viewed from the first ground potential GND1 is
  expressed by "Vs=−Vf" in the state $ST_{OFF+}$,
  expressed by "Vs=Vout" in the state $ST_{OFF0}$, and
  expressed by "Vs=Vd−IL×Ron" in the state $ST_{ON}$.
  Here, "Vf" denotes a forward voltage of the freewheeling diode 32, and "Ron" denotes an on resistance of the transistor M0. When the resistance value of the sense resistance Rcs is not ignored, it suffices to construe "Ron" as a sum of the respective resistance values of the on resistance of the transistor M0 and the sense resistance Rcs.

That is, the source potential Vs as viewed from the first ground potential GND1, that is, a potential difference (Vs−GND1) is
  a voltage (−Vf) in the state $ST_{OFF+}$,
  the output voltage Vout in the state $ST_{OFF0}$, and
  a voltage lower than the drain potential Vd by an amount of voltage drop by the resistance Ron in the state $ST_{ON}$ (see FIG. 5).

However, in the state $ST_{OFF0}$, the potential difference (Vs−GND1) oscillates freely with the output voltage Vout at a center due to a circuit formed by the inductor 31 and a capacitor connected to the inductor 31 (including the smoothing capacitor 33) (see FIG. 5).

Potential Difference (Vd−Vs)

As is clear from the foregoing description, a potential difference (Vd−Vs) is
  expressed by "Vd−Vs=Vac×√2+Vf" in the state $ST_{OFF+}$,
  expressed by "Vd−Vs=Vac×√2−Vout" in the state $ST_{OFF0}$, and
  expressed by "Vd−Vs=IL×Ron" in the state $ST_{ON}$.

However, in the state $ST_{OFF0}$, the potential difference (Vd−Vs) oscillates freely with a voltage (Vac×√2−Vout) at a center due to the circuit formed by the inductor 31 and the capacitor connected to the inductor 31 (including the smoothing capacitor 33) (see FIG. 5).

The voltage (Vac×√2) is sufficiently high with respect to the voltage Vf. Thus, the potential difference (Vd−Vs) in the state $ST_{OFF+}$ can be considered to be substantially equal to the voltage (Vac×√2). Therefore, when the potential difference (Vd−Vs) in the state $ST_{OFF+}$ is sampled in the semiconductor device 100, the magnitude of the alternating-current voltage Vac (hence the magnitude of the input voltage Vin) can be evaluated, and low voltage protection and overvoltage protection related to the input voltage Vin can be performed.

Here, it suffices to set a sampling timing of the potential difference (Vd−Vs) immediately after the turning off of the transistor M0. This is because energy should be stored in the inductor 31 immediately after the turning off of the transistor M0. However, the potential difference (Vd−Vs) may not be stable (the potential difference (Vd−Vs) may not represent the voltage (Vac×√2) correctly) immediately after the transistor M0 just switches from an on state to an off state. It therefore suffices to sample the potential difference (Vd−Vs) at a timing later than the turn-off timing of the transistor M0 by a predetermined period of minute time $t_{DLY}$. In actuality, voltage Vbr as a divided voltage of the potential difference (Vd−Vs) can be sampled (see FIG. 5). The voltage Vbr is a voltage having the second ground potential GND2 as a reference.

Incidentally, FIG. 5 illustrates the plurality of voltage waveforms on scales different from each other for convenience of illustration (the same is true for FIG. 10 to be described later). For example, FIG. 5 illustrates the waveforms of the potential difference (Vd−Vs) and a potential difference (Vbr−GND2) as if the potential difference (Vd−Vs) had an amplitude nearly equal to that of the potential difference (Vbr−GND2) for convenience of illustration. However, the potential difference (Vd−Vs) and the potential difference (Vbr−GND2) greatly differ from each other in amplitude (for example, differ from each other in amplitude by a factor of approximately 100).

[Protecting Operation by Protecting Circuit]

Figure 6:
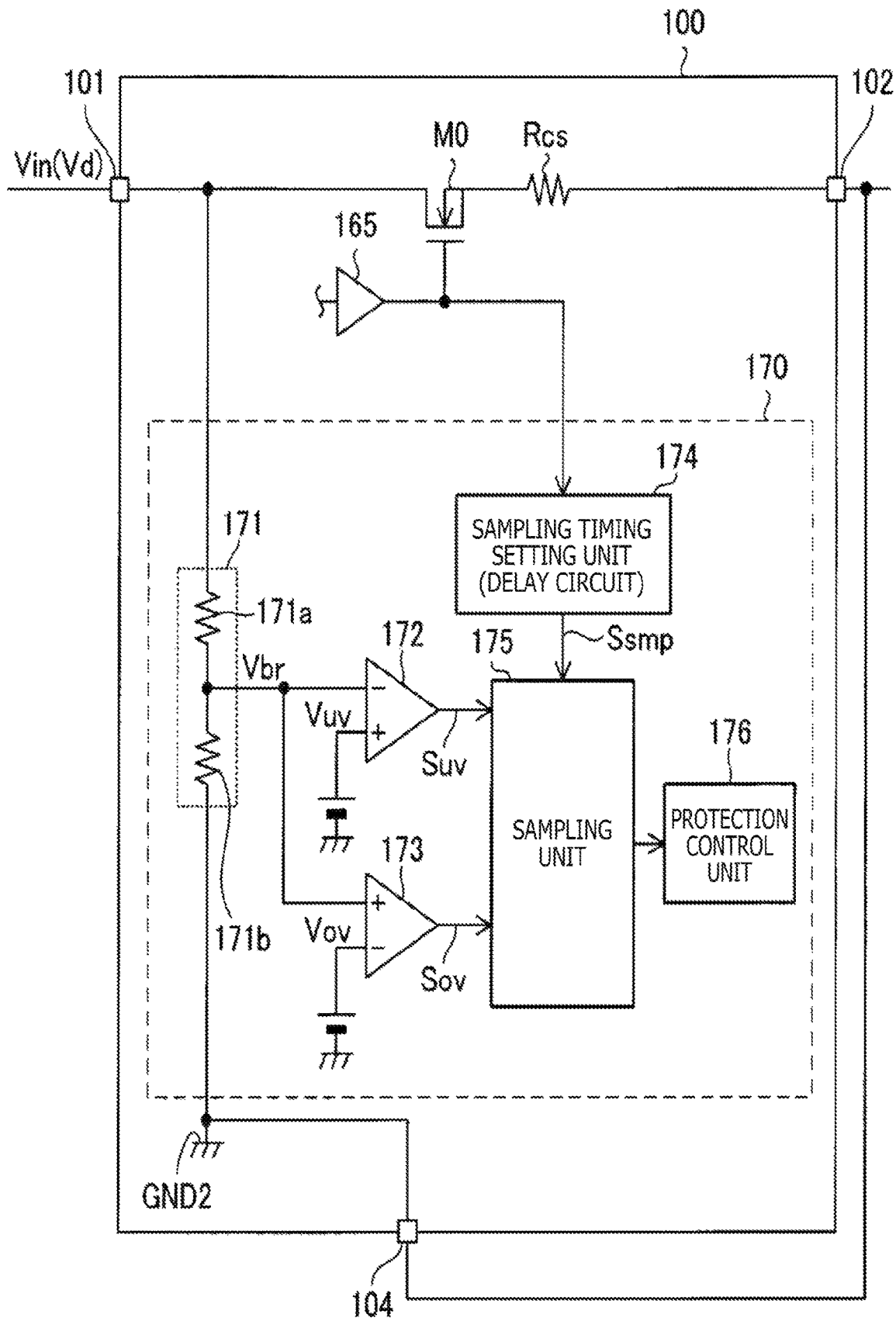
FIG. 6 is a diagram illustrating a partial configuration of the semiconductor device according to the embodiment of the present disclosure, and is a diagram illustrating an example of a configuration of a protecting circuit.

The control circuit 110 of the semiconductor device 100 is provided with a protecting circuit 170 (see FIG. 1). The protecting circuit 170 can perform a low voltage/overvoltage detecting operation based on the voltage Vbr and a protecting operation based on a result of the low voltage/overvoltage detecting operation. FIG. 6 illustrates an example of a configuration of the protecting circuit 170.

The protecting circuit 170 of FIG. 6 includes a voltage dividing circuit 171, a comparator 172 for low voltage state detection, a comparator 173 for overvoltage state detection, a sampling timing setting unit 174, a sampling unit 175, and a protection control unit 176.

The voltage dividing circuit 171 is formed by a series circuit of voltage dividing resistances 171a and 171b. The voltage dividing circuit 171 generates the voltage Vbr by dividing the potential difference (Vd−Vs) (in other words, by dividing the voltage between the terminals 101 and 102). Specifically, one terminal of the voltage dividing resistance 171a is connected to the terminal 101 (therefore connected to the drain of the transistor M0), and another terminal of the voltage dividing resistance 171a is connected to the terminal 104 via the voltage dividing resistance 171b (in other words, connected to the second ground GND2 via the voltage dividing resistance 171b). The voltage Vbr occurs at a connection node between the voltage dividing resistances 171a and 171b. Thus, the voltage dividing circuit 171 generates the voltage Vbr by dividing the input voltage Vin with the second ground potential GND2 as a reference. The semiconductor device 100 has one or more semiconductor substrates including silicon and is formed by integrating each circuit forming the semiconductor device 100 on the one or more semiconductor substrates. The voltage dividing circuit 171 (that is, the voltage dividing resistances 171a and 171b) is formed in an integrated state on a semiconductor substrate constituting the semiconductor device 100. The voltage dividing resistances 171a and 171b are preferably formed by using high withstand voltage polysilicon or by using a material equivalent thereto. That is, for example, the voltage dividing resistances 171a and 171b are preferably formed by using silicon within the semiconductor substrate where the voltage dividing circuit 171 is to be formed.

The comparator 172 compares the voltage Vbr with a predetermined lower side determination voltage Vuv and outputs a lower side determination signal Suv that indicates height relation between the voltages Vbr and Vuv. The comparator 173 compares the voltage Vbr with a predetermined upper side determination voltage Vov and outputs an upper side determination signal Sov indicating height relation between the voltages Vbr and Vov.

The lower side determination voltage Vuv and the upper side determination voltage Vov are a positive direct-current voltage having the second ground potential GND2 as a reference. That is, the lower side determination voltage Vuv has a potential higher than the second ground potential GND2 by the voltage Vuv, and the upper side determination voltage Vov has a potential higher than the second ground potential GND2 by the voltage Vov. The upper side determination voltage Vov has a potential higher than the lower side determination voltage Vuv.

In the configuration example of FIG. 6, the voltage Vbr and the lower side determination voltage Vuv are respectively input to an inverting input terminal and a non-inverting input terminal of the comparator 172, and the voltage Vbr and the upper side determination voltage Vov are respectively input to a non-inverting input terminal and an inverting input terminal of the comparator 173. The comparator 172 sets the lower side determination signal Suv at a high level only when the voltage Vbr is lower than the lower side determination voltage Vuv. The comparator 172 otherwise sets the lower side determination signal Suv at a low level. The comparator 173 sets the upper side determination signal Sov at a high level only when the voltage Vbr is higher than the upper side determination voltage Vov. The comparator 173 otherwise sets the upper side determination signal Sov at a low level.

The sampling timing setting unit 174 sets a sampling timing on the basis of the gate signal supplied from the gate driver 165 to the gate of the transistor M0. The setting unit 174 sets, as the sampling timing, a timing at which a predetermined period of time $t_{DLY}$ has passed from a timing at which the gate signal of the transistor M0 switches from a high level to a low level, and generates and outputs a sampling specifying signal Ssmp indicating a result of the setting. The setting unit 174 can be constituted by a delay circuit that delays the gate signal of the transistor M0. The predetermined period of time $t_{DLY}$ is, for example, two microseconds. The setting unit 174 may set the sampling timing on the basis of the signal Spwm (see FIG. 4).

The predetermined period of time $t_{DLY}$ is determined such that at the sampling timing, stability of the potential difference (Vd−Vs) is expected and the remaining of the energy stored in the inductor 31 is expected. A lower limit may be set to a length of the on interval of the transistor M0 in the switching control unit 160, and when characteristics of the inductor 31 are set appropriately, energy surely remains in the inductor 31 at a timing later than the turn-off timing of the transistor M0 by the predetermined period of time $t_{DLY}$. That is, in the present configuration, part of the energy stored in the inductor 31 during the on interval of the transistor M0 remains in the inductor 31 at the sampling timing. The remaining of part of the energy stored in the inductor 31 during the on interval of the transistor M0 in the inductor 31 at the sampling timing is equivalent to the remaining of the inductor current IL produced during the on interval of the transistor M0 at the sampling timing (in other words, the flowing of part of the inductor current IL produced during the on interval of the transistor M0 through the inductor 31 at the sampling timing).

The sampling unit 175 receives the lower side determination signal Suv, the upper side determination signal Sov, and the sampling specifying signal Ssmp. The sampling unit 175 samples the signals Suv and Sov at the sampling timing set in the setting unit 174 and sends a sampling result to the protection control unit 176.

The protection control unit 176 determines which one of a normal voltage state, a low voltage state, and an overvoltage state the state of the input voltage Vin belongs to, on the basis of the sampling result of the sampling unit 175. The low voltage/overvoltage detecting operation of the protecting circuit 170 includes processing of determining which one of the normal voltage state, the low voltage state, and the overvoltage state the state of the input voltage Vin belongs to, on the basis of the sampling result of the sampling unit 175. The protection control unit 176 can perform a predetermined protecting operation on the basis of a result of the determination.

A state in which the voltage Vbr at the sampling timing is lower than the lower side determination voltage Vuv corresponds to the low voltage state in which the input voltage Vin is too low. A state in which the voltage Vbr at the sampling timing is higher than the upper side determination voltage Vov corresponds to the overvoltage state in which the input voltage Vin is too high. The low voltage state can also be said to be a state in which the alternating-current voltage Vac is too low. The overvoltage state can also be said to be a state in which the alternating-current voltage Vac is too high.

Hence, the protection control unit 176 determines that the input voltage Vin is in the low voltage state when a sampling result indicating that the lower side determination signal Suv at the sampling timing is at a high level (that is, that the voltage Vbr at the sampling timing is lower than the lower side determination voltage Vuv) is output from the sampling unit 175. The protection control unit 176 determines that the input voltage Vin is in the overvoltage state when a sampling result indicating that the upper side determination signal Sov at the sampling timing is at a high level (that is, that the voltage Vbr at the sampling timing is higher than the upper side determination voltage Vov) is output from the sampling unit 175. The protection control unit 176 determines that the input voltage Vin is in the normal voltage state when a sampling result indicating that the signals Suv and Sov at the sampling timing are both at a low level (that is, that the voltage Vbr at the sampling timing is higher than the lower side determination voltage Vuv but lower than the upper side determination voltage Vov) is output from the sampling unit 175.

The above-described sampling by the sampling unit 175 and the above-described determination by the protection control unit 176 are performed each time the turning off of the transistor M0 occurs in the normal switching control (that is, in each switching cycle of the transistor M0). In the following, for convenience, the voltage Vbr at the sampling timing set by the setting unit 174 will particularly be referred to as a first evaluation voltage Vbr.

The protection control unit 176 performs a low voltage corresponding protecting operation when the sampled lower side determination signal Suv continues to be maintained at a high level for a predetermined period of lower side determination time tuv or more, that is, when the low voltage state in which the first evaluation voltage Vbr is lower than the lower side determination voltage Vuv continues for the predetermined period of lower side determination time tuv or more in the normal switching control. The lower side determination signal Suv is sampled each time the turning off of the transistor M0 occurs. The low voltage corresponding protecting operation is performed when all of $m_A$ lower side determination signals Suv consecutively sampled are at a high level ($m_A$ is an integer of two or more) and a period of time equal to or more than the lower side determination time tuv has passed while the $m_A$ lower side determination signals Suv are sampled.

Similarly to this, the protection control unit 176 performs an overvoltage corresponding protecting operation when the sampled upper side determination signal Sov continues to be maintained at a high level for a predetermined period of upper side determination time tov or more, that is, when the overvoltage state in which the first evaluation voltage Vbr exceeds the upper side determination voltage Vov continues for the predetermined period of upper side determination time tov or more in the normal switching control. The upper side determination signal Sov is sampled each time the turning off of the transistor M0 occurs. The overvoltage corresponding protecting operation is performed when all of $m_B$ upper side determination signals Sov consecutively sampled are at a high level ($m_B$ is an integer of two or more) and a period of time equal to or more than the upper side determination time tov has passed while the $m_B$ upper side determination signals Sov are sampled.

The low voltage corresponding protecting operation and the overvoltage corresponding protecting operation are identical to each other. Hence, in the following, unless particularly necessary, the low voltage corresponding protecting operation and the overvoltage corresponding protecting operation will collectively be referred to as protecting operation. In the following, unless particularly described, the protecting operation is construed as referring to any one of the low voltage corresponding protecting operation and the overvoltage corresponding protecting operation. In the protecting operation, the switching of the transistor M0 by the switching control unit 160 is stopped, and the transistor M0 is fixed to an off state.

Thus, the protecting circuit 170 sets, as the sampling timing, a timing at which the predetermined period of time $t_{DLY}$ has passed from the turning off of the transistor M0 in a process in which the switching of the transistor M0 is performed and refers to, as the first evaluation voltage Vbr, the voltage Vbr corresponding to the voltage between the terminals 101 and 102 (that is, the voltage Vbr corresponding to the potential difference (Vd−Vs)) at the sampling timing. Then, the protecting circuit 170 can perform the protecting operation that stops the switching of the transistor M0 and fixes the transistor M0 to an off state on the basis of the first evaluation voltage Vbr.

It is thereby possible to suppress the occurrence of inconveniences caused by continuing switching in the low voltage state or the overvoltage state.

When the power consumption of a load device (not illustrated) connected to the output terminal pair and driven at the output voltage Vout is considered to be fixed, in the low voltage state, an average current value of the inductor current IL is large as compared with the normal voltage state, and as a result, heat generation in an element through which the inductor current IL flows (transistor M0, in particular) is increased. The lower side determination time tuv is set in consideration of an allowable amount of this heat generation. For example, the lower side determination time tuv is 120 milliseconds. On the other hand, switching in the overvoltage state tends to lead to degradation in and damage to the transistor M0 and elements connected thereto even when the switching in the overvoltage state is performed for a short period of time. Therefore, the upper side determination time tov is preferably set shorter than the lower side determination time tuv and is, for example, 100 microseconds.

One of the following first to third returning methods can be adopted as a method for returning to a state in which the switching of the transistor M0 is performed after the protecting operation is performed.

[First Returning Method]

Figure 7:
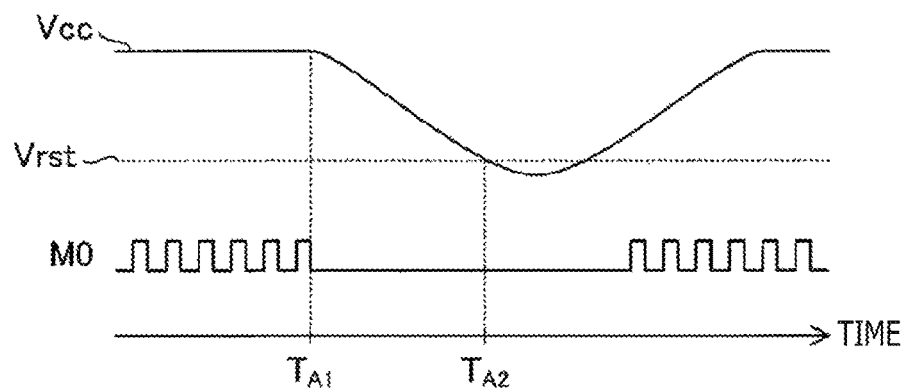
FIG. 7 is a diagram of assistance in explaining a first returning method for returning from a protecting operation according to the embodiment of the present disclosure.

A first returning method will be described with reference to FIG. 7. FIG. 7 is a timing diagram illustrating a flow of the first returning method. Suppose that, after normal switching operation (step S17) is started after the starting of the control circuit 110 (step S14), the protecting operation starts to be performed with a timing $T_{A1}$ in which the power supply voltage Vcc is generated on the basis of the output voltage Vout as a starting point. Then, the switching of the transistor M0 which switching is performed until the timing $T_{A1}$ is stopped with the timing $T_{A1}$ as a starting point. After the timing $T_{A1}$, the protecting operation fixes the transistor M0 to an off state.

When the transistor M0 is fixed to an off state, the transmission of power from the input wiring IW to the output wiring OW ceases, and therefore, the output voltage Vout decreases due to the power consumption of the load device connected to the output terminal pair and the like. The power supply voltage Vcc also decreases in association with the decrease in the output voltage Vout. The power supply voltage Vout falls below the above-described reset voltage Vrst at a timing $T_{A2}$. That is, a transition is made from the non-reset state to the reset state in the timing $T_{A2}$. The first returning method continues the protecting operation until the reset state is reached, once the protecting operation is started.

As the transition to the reset state is made, the control circuit 110 stops operating. The fact that the protecting operation has been performed is not latched in the control circuit 110. Hence, the protecting operation is canceled with the operation stop of the control circuit 110 due to the transition to the reset state (that is, a transition is made to a state in which the switching of the transistor M0 is allowed).

After a transition is made to the reset state, the starting circuit 120 performs the above-described starting charging operation, and therefore, the power supply voltage Vcc turns to an increase (step S12). The control circuit 110 is restarted after the starting charging operation performed for a while (step S14). Incidentally, a hysteresis characteristic may be provided to switching between the reset state and the non-reset state with the reset voltage Vrst as a boundary, though no particular attention has been paid thereto thus far (FIG. 7 does not illustrate details of the hysteresis characteristic).

As described above, the protecting operation is canceled as a transition to the reset state is made. Thus, when the control circuit 110 is restarted, the normal switching control (step S17) is started after the starting operation (step S15). Also after the restarting of the control circuit 110, control as to whether or not to perform the protecting operation on the basis of the voltage Vbr is performed. Hence, when the low voltage state or the overvoltage state as a trigger for performing the protecting operation at the timing $T_{A1}$ is not resolved, the protecting operation is promptly performed again after the restarting of the control circuit 110.

[Second Returning Method]

Figure 8:
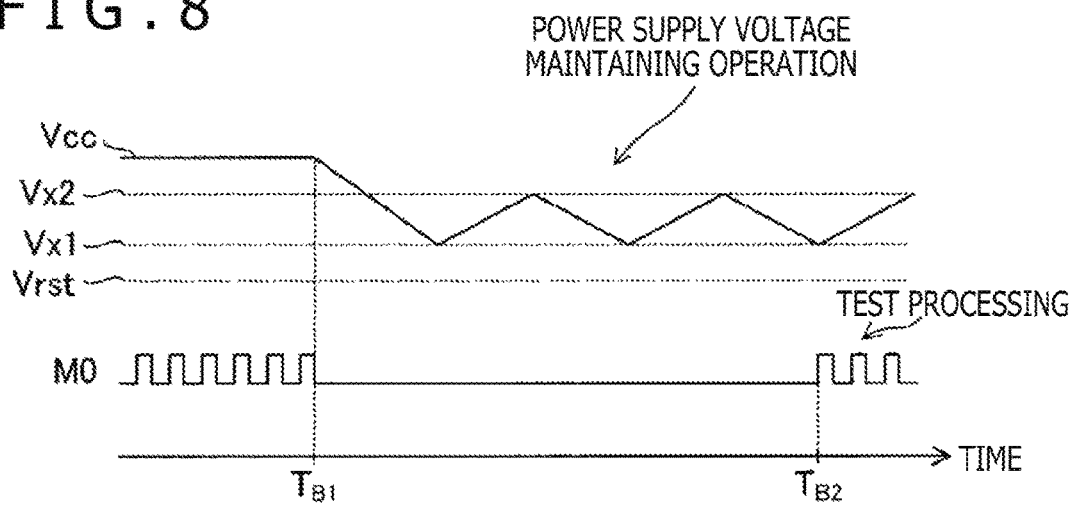
FIG. 8 is a diagram of assistance in explaining a second returning method for returning from the protecting operation according to the embodiment of the present disclosure.

A second returning method will be described with reference to FIG. 8. FIG. 8 is a timing diagram illustrating a flow of the second returning method. Suppose that, after the normal switching operation (step S17) is started after the starting of the control circuit 110 (step S14), the protecting operation starts to be performed with a timing $T_{B1}$ in which the power supply voltage Vcc is generated on the basis of the output voltage Vout as a starting point. Then, the switching of the transistor M0 which switching is performed until the timing $T_{B1}$ is stopped with the timing $T_{B1}$ as a starting point. After the timing $T_{B1}$, the protecting operation fixes the transistor M0 to an off state.

When the transistor M0 is fixed to an off state, the transmission of power from the input wiring IW to the output wiring OW ceases, and therefore, the output voltage Vout decreases due to the power consumption of the load device connected to the output terminal pair and the like. The power supply voltage Vcc also decreases in association with the decrease in the output voltage Vout. In the second returning method, however, the starting circuit 120 performs a power supply voltage maintaining operation that holds the power supply voltage Vcc higher than the reset voltage Vrst in an interval in which the transistor M0 is fixed to an off state by the protecting operation. Specifically, for example, in the power supply voltage maintaining operation, the starting circuit 120 monitors the power supply voltage Vcc, and the starting circuit 120 starts a power supply voltage maintaining charging operation when the power supply voltage Vcc decreases to a predetermined voltage Vx1 higher than the reset voltage Vrst. Then, the starting circuit 120 stops the power supply voltage maintaining charging operation when the power supply voltage Vcc reaches a predetermined voltage Vx2 higher than the predetermined voltage Vx1 in the power supply voltage maintaining charging operation. The power supply voltage maintaining charging operation is an operation similar to the starting charging operation. The power supply voltage maintaining charging operation charges the capacitor 35 connected to the terminal 103 on the basis of the input voltage Vin and thereby raises the power supply voltage Vcc.

When the second returning method is thus adopted, the control circuit 110 does not reach the reset state due to the power supply voltage maintaining operation even when the protecting operation is being performed.

The semiconductor device 100 has a timer function that can measure an elapsed period of time from a time point. The control circuit 110 (for example, the switching control unit 160 or the protection control unit 176) measures the elapsed period of time from the time point of a start of the protecting operation by using the timer function. When a predetermined period of standby time passes from the timing $T_{B1}$, the switching control unit 160 according to the second returning method performs test processing that temporarily switches the transistor M0 against the protecting operation under control of the protection control unit 176. In the example of FIG. 8, a timing $T_{B2}$ corresponds to a timing after the predetermined period of standby time from the timing $T_{B1}$, and the test processing is performed with the timing $T_{B2}$ as a starting point.

In the test processing, the switching of the transistor M0 which switching is similar to that in the normal switching control is performed, and the above-described low voltage/overvoltage detecting operation is performed in the protecting circuit 170. In the test processing, for example, the switching of the transistor M0 is repeatedly performed for a certain period of time, or a unit switching operation of turning off the transistor M0 after turning on the transistor M0 is repeatedly performed a predetermined number of times.

The protection control unit 176 continues or cancels the protecting operation on the basis of the first evaluation voltage Vbr obtained in the test processing (that is, the voltage Vbr at the sampling timing).

Specifically, for example, the protection control unit 176 samples the lower side determination signal Suv at one or more sampling timings in the test processing. When all of the lower side determination signals Suv at each sampling timing are at a low level, the protection control unit 176 determines that the input voltage Vin is not in the low voltage state. The protection control unit 176 otherwise determines that the input voltage Vin is in the low voltage state.

Similarly, for example, the protection control unit 176 samples the upper side determination signal Sov at one or more sampling timings in the test processing. When all of the upper side determination signals Sov at each sampling timing are at a low level, the protection control unit 176 determines that the input voltage Vin is not in the overvoltage state. The protection control unit 176 otherwise determines that the input voltage Vin is in the overvoltage state.

Then, when the protection control unit 176 determines in the test processing that the input voltage Vin is neither in the low voltage state nor in the overvoltage state, the protection control unit 176 ends the protecting operation started at the timing $T_{B1}$ and resumes the normal switching operation.

When the protection control unit 176 determines in the test processing that the input voltage Vin is in the low voltage state or the overvoltage state, on the other hand, the protection control unit 176 continues the protecting operation started at the timing $T_{B1}$ after the test processing (that is, returns to the state in which the transistor M0 is fixed to an off state). In this case, after the predetermined period of standby time passes again from a point in time at which the continuation of the protecting operation is determined, the test processing is performed again, and the above-described operation is repeated.

[Third Returning Method]

Figure 9:
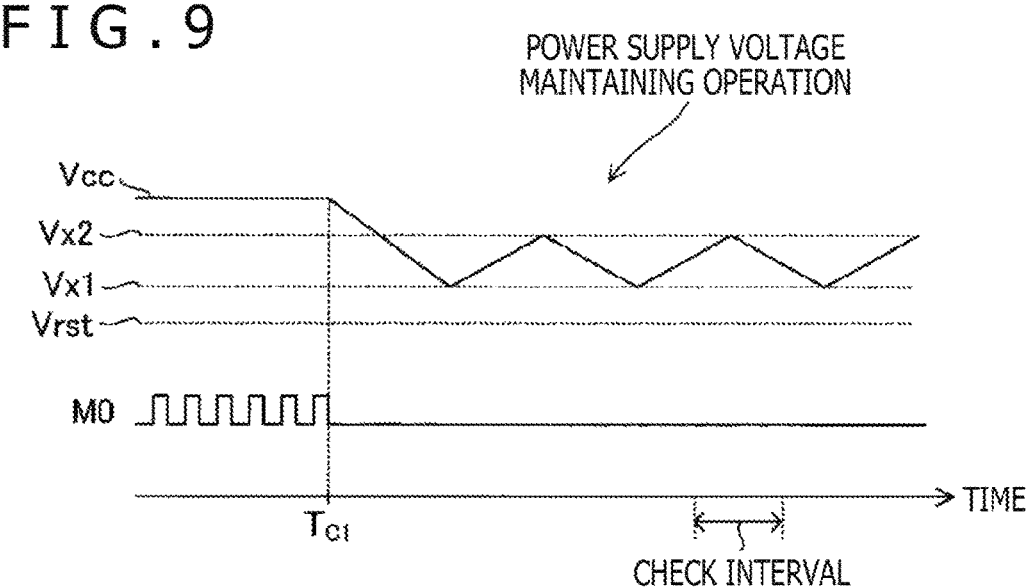
FIG. 9 is a diagram of assistance in explaining a third returning method for returning from the protecting operation according to the embodiment of the present disclosure.

A third returning method will be described with reference to FIG. 9. FIG. 9 is a timing diagram illustrating a flow of the third returning method. Suppose that, after the normal switching operation (step S17) is started after the starting of the control circuit 110 (step S14), the protecting operation starts to be performed with a timing $T_{C1}$ in which the power supply voltage Vcc is generated on the basis of the output voltage Vout as a starting point. Then, the switching of the transistor M0 which switching is performed until the timing $T_{C1}$ is stopped with the timing $T_{C1}$ as a starting point. After the timing $T_{C1}$, the protecting operation fixes the transistor M0 to an off state.

When the transistor M0 is fixed to an off state, the transmission of power from the input wiring IW to the output wiring OW ceases, and therefore, the output voltage Vout decreases due to the power consumption of the load device connected to the output terminal pair and the like. The power supply voltage Vcc also decreases in association with the decrease in the output voltage Vout. In the third returning method, however, as in the second returning method, the starting circuit 120 performs a power supply voltage maintaining operation that holds the power supply voltage Vcc higher than the reset voltage Vrst in an interval in which the transistor M0 is fixed to an off state by the protecting operation. The contents of the power supply voltage maintaining operation are as described above. When the third returning method is adopted, the control circuit 110 does not reach the reset state due to the power supply voltage maintaining operation even while the protecting operation is being performed.

The protecting circuit 170 according to the third returning method sets a check interval while the switching of the transistor M0 is stopped by the protecting operation after the timing $T_{C1}$. The check interval has a length of a predetermined period of time. The check interval may be any interval as long as the check interval is an interval set after the timing $T_{C1}$. However, suppose that the energy stored in the inductor 31 during the check interval is zero. The energy stored in the inductor 31 during the check interval can be regarded as zero when the check interval is set after the passage of a predetermined period of time having a suitable length after the switching of the transistor M0 is stopped in the protecting operation.

The protecting circuit 170 according to the third returning method determines whether or not to continue the protecting operation on the basis of the voltage Vbr during the check interval, and continues or cancels the protecting operation being performed according to a result of the determination.

Figure 10:
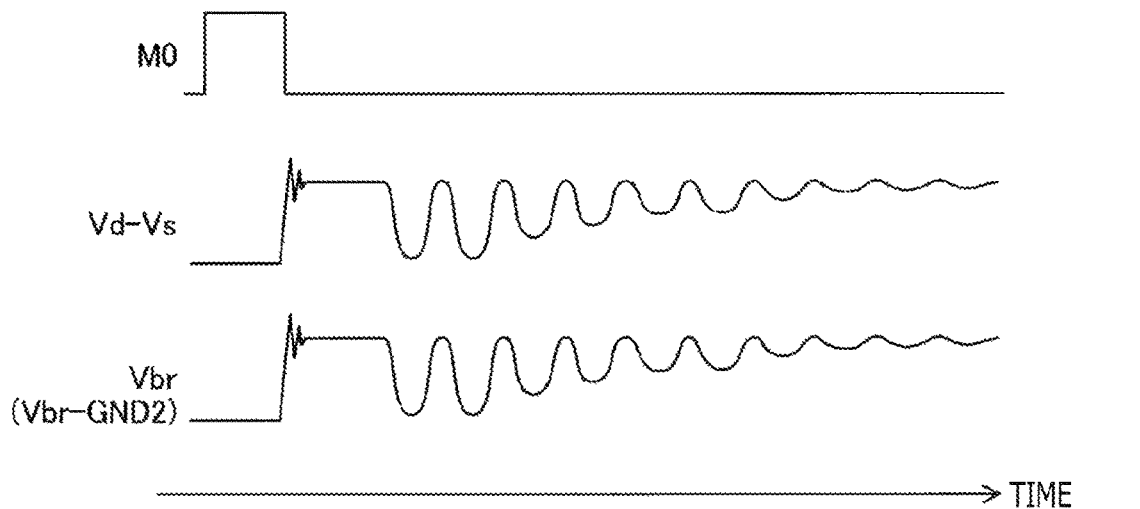
FIG. 10 is a diagram illustrating a few voltage waveforms accompanying turning off of a transistor according to the embodiment of the present disclosure.

Referring to FIG. 10, description will be added to this. FIG. 10 illustrates the potential difference (Vd–Vs) and the potential difference (Vbr–GND2) when the protecting operation fixes the transistor M0 to an off state after the transistor M0 is turned on and turned off. As described above, in the present embodiment, the voltage Vbr is defined as a voltage as viewed from the second ground potential GND2. The potential difference (Vbr–GND2) and the voltage Vbr therefore refer to the same thing.

In the state $ST_{OFF0}$ in which the transistor M0 is in an off state and no energy is stored in the inductor 31, the potential difference (Vd–Vs) oscillates freely with the voltage (Vac×√2–Vout) at a center. However, the output voltage Vout is expected to decrease to zero after a stop of the switching of the transistor M0. That is, when the output voltage Vout at the start timing $T_{C1}$ of the protecting operation is represented as "Vout[$T_{C1}$]," a center voltage of the potential difference (Vd–Vs) in the state $ST_{OFF0}$ after the timing $T_{C1}$ falls within a range from a voltage (Vac×√2) to a voltage (Vac×√2–Vout[$T_{C1}$]).

It is expected that when the check interval is set sufficiently later than the timing $T_{C1}$, the free oscillation of the potential difference (Vd–Vs) converges, and the output voltage Vout is zero. When a resistance is connected between the output terminals OUTa and OUTb, though not particularly illustrated in FIG. 1 and the like, the output voltage Vout goes to zero due to a discharge of the smoothing capacitor 33 via the resistance in the protecting operation. In a returning method $R_{3A}$ belonging to the third returning method, suppose that the check interval is set sufficiently later than the timing $T_{C1}$, and therefore, suppose that the free oscillation of the potential difference (Vd–Vs) converges and the output voltage Vout in the check interval can be regarded as zero before the check interval arrives.

Then, in the returning method $R_{3A}$, the potential difference (Vd–Vs) during the check interval is the voltage (Vac×√2) corresponding to the input voltage Vin, and the voltage Vbr during the check interval is a divided voltage of the voltage (Vac×√2). Hence, the magnitude of the input voltage Vin (in other words, the magnitude of the alternating-current voltage Vac) can be determined on the basis of the voltage Vbr during the check interval, and whether or not to continue the protecting operation can be determined.

Specifically, for example, the following suffices. The protection control unit 176 according to the returning method $R_{3A}$ refers to the voltage Vbr during the check interval as a second evaluation voltage Vbr. Then, when the second evaluation voltage Vbr is within a predetermined normal voltage range RNG, the protection control unit 176 determines that the input voltage Vin is neither in the low voltage state nor in the overvoltage state (determines that the low voltage state or the overvoltage state is resolved), ends the protecting operation started at the timing $T_{C1}$, and resumes the normal switching operation. When the second evaluation voltage Vbr deviates from the predetermined normal voltage range RNG, on the other hand, the protection control unit 176 determines that the low voltage state or the overvoltage state is not resolved and continues the protecting operation. In this case, after the passage of a predetermined period of standby time from a time point at which the continuation of the protecting operation is determined, the check interval is set again, and the above-described operation is repeated.

A lower limit and an upper limit of the normal voltage range RNG may be respectively set to be the lower side determination voltage Vuv and the upper side determination voltage Vov by using the configuration of FIG. 6. In this case, the protection control unit 176 can determine whether or not the second evaluation voltage Vbr is within the normal voltage range RNG on the basis of the lower side determination signal Suv and the upper side determination signal Sov during the check interval. However, a voltage different from the lower side determination voltage Vuv can also be used as the lower limit of the normal voltage range RNG, and a voltage different from the upper side determination voltage Vov can also be used as the upper limit of the normal voltage range RNG.

Incidentally, while it has been mentioned that, in the returning method $R_{3A}$, the output voltage Vout in the check interval can be regarded as zero, the output voltage Vout in the check interval may not actually be zero. Even when the output voltage Vout in the check interval is not zero, the potential difference (Vd–Vs) falls within the range from the voltage (Vac×√2) to the voltage (Vac×√2–Vout[$T_{C1}$]) as long as the free oscillation has converged. Then, generally, the voltage (Vac×√2) is considerably higher than the voltage Vout[$T_{C1}$]. Thus, even when the output voltage Vout in the check interval is close to the voltage Vout[$T_{C1}$], the magnitude of the input voltage Vin (in other words, the magnitude of the alternating-current voltage Vac) can be determined on the basis of the voltage Vbr during the check interval, and whether or not to continue the protecting operation can be determined. The voltage Vout[$T_{C1}$] in this case acts as an error factor. It therefore suffices to set the above-described normal voltage range RNG in consideration of the presence of this error factor.

A returning method $R_{3B}$ different from the returning method $R_{3A}$ can also be adopted. The returning method $R_{3B}$ is also a kind of the third returning method that continues or cancels the protecting operation on the basis of the voltage Vbr during the check interval. The returning method $R_{3B}$ can set the check interval at any timing after a start of the protecting operation. Because no limitation is imposed on the setting timing of the check interval, the returning method $R_{3B}$ may set an interval in which the free oscillation of the potential difference (Vd−Vs) has not converged as the check interval. In consideration of this, the protection control unit 176 according to the returning method R$_{3B}$ refers to an average voltage of the voltage Vbr during the check interval as the second evaluation voltage Vbr. A method of continuing or canceling the protecting operation on the basis of the second evaluation voltage Vbr referred to is as described above (that is, similar to the returning method R$_{3A}$).

However, when the returning method R$_{3B}$ is adopted, the protecting circuit 170 may need an average voltage deriving circuit (not illustrated) for deriving the average voltage of the voltage Vbr during the check interval. The average voltage deriving circuit may be formed by an analog circuit. Alternatively, the average voltage deriving circuit may derive the average voltage of the voltage Vbr during the check interval by sampling the voltage Vbr at a plurality of timings during the check interval, detecting voltage values of the voltage Vbr at the respective timings, and averaging the plurality of obtained detected voltage values by digital processing.

[Modifications and the Like]

Several applied technologies and modified technologies according to the present embodiment will be described in the following.

Figure 11:
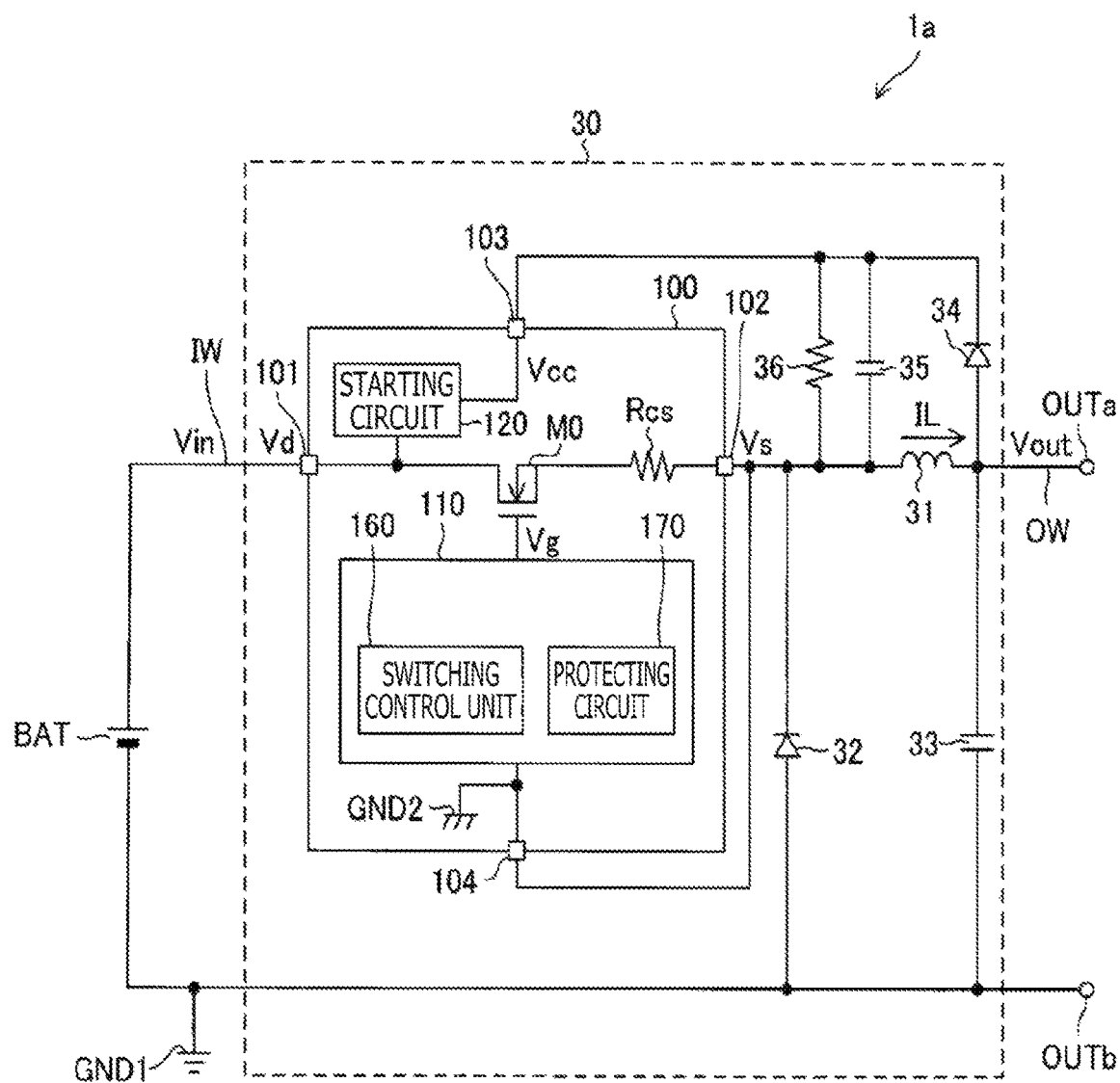
FIG. 11 is a general configuration diagram of a modification of the power supply device according to the embodiment of the present disclosure.
Figure 12:
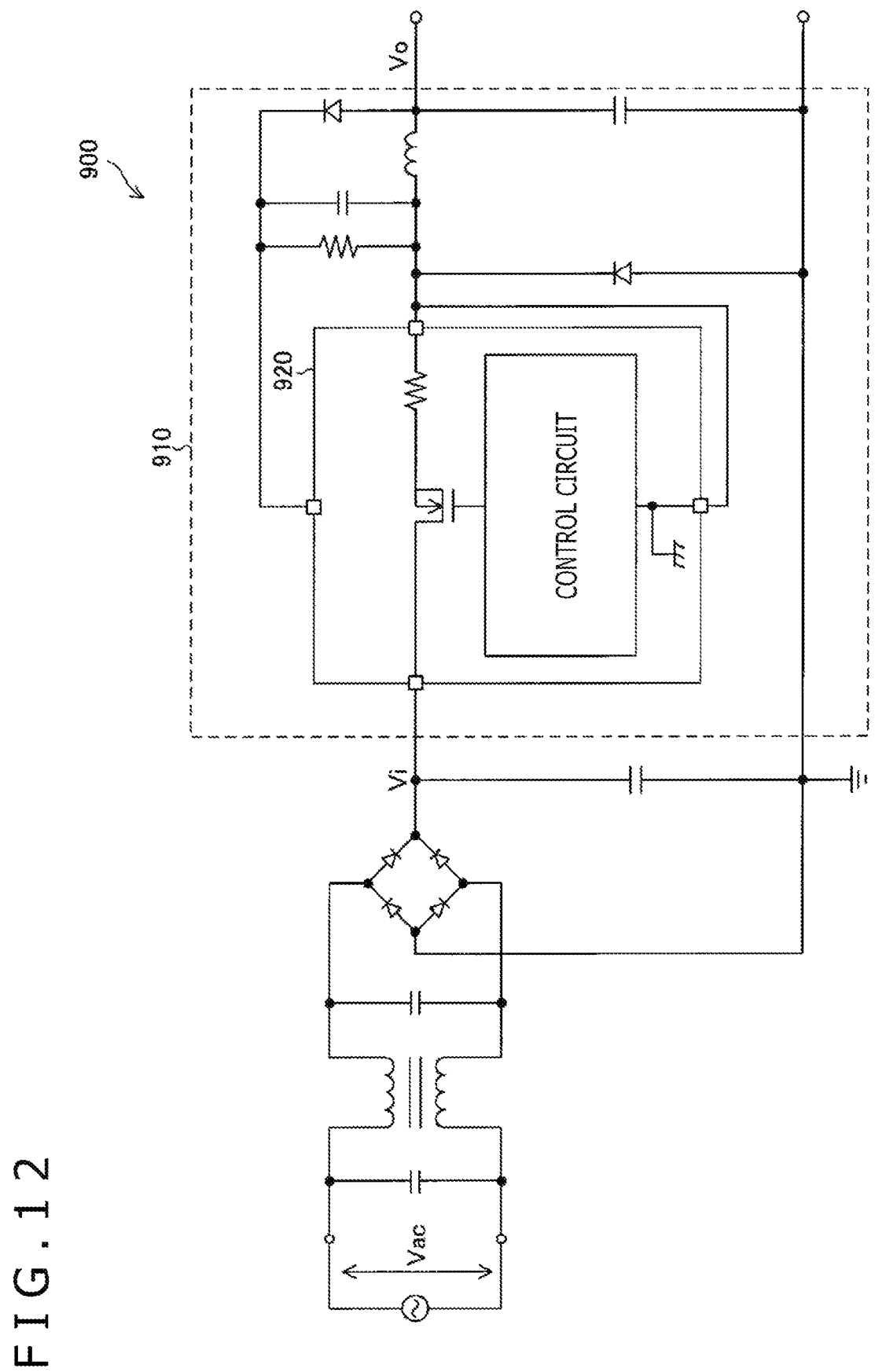
FIG. 12 is a general configuration diagram of a power supply device including a non-isolated buck converter according to a reference configuration.

In the power supply device 1 of FIG. 1, the input voltage Vin to the non-isolated buck converter 30 is generated from the alternating-current voltage Vac. However, the input voltage Vin to the non-isolated buck converter 30 may be supplied from any direct-current voltage source. That is, a power supply device 1*a* as illustrated in FIG. 11, for example, may be configured. The power supply device 1*a* of FIG. 11 is formed by making a modification to the power supply device 1 of FIG. 1 such that the alternating-current input terminal pair (INa and INb), the filter unit 10, the full-wave rectifier circuit 20, and the smoothing capacitor 40 are replaced with a battery BAT. In the power supply device 1*a*, the battery BAT that outputs a predetermined direct-current voltage is connected between the first ground GND1 and the input wiring IW, and the output voltage of the battery BAT is applied as the input voltage Vin to the input wiring IW.

The battery BAT is, for example, formed by a lithium ion battery. The output voltage of the battery BAT may be set to a desired value and is, for example, 48 V. The battery BAT may be mounted in a vehicle such as an automobile. In this case, the power supply device 1*a* is mounted in a vehicle.

While description has been made of the non-isolated buck converter 30 that can perform both the low voltage corresponding protecting operation and the overvoltage corresponding protecting operation, the non-isolated buck converter 30 may be able to perform only one protecting operation of the low voltage corresponding protecting operation and the overvoltage corresponding protecting operation.

In the configuration of FIG. 6, the voltage dividing circuit 171 may be provided to the outside of the semiconductor device 100 and externally connected to the semiconductor device 100. In this case, an external terminal receiving the voltage Vbr from the voltage dividing circuit 171 is added to the semiconductor device 100.

Relation between high levels and low levels of any signals or voltages may be reversed in a form that does not compromise the above-described gist.

A DC/DC converter (not illustrated) that converts the direct-current output voltage Vout into another direct-current voltage may be provided in a stage subsequent to the power supply device 1 or 1*a*. The output voltage Vout or the other direct-current voltage is supplied to a load device (not illustrated).

An electric apparatus including the power supply device 1 or 1*a* and the above-described load device may be configured (not illustrated except for the power supply devices 1 and 1*a*). The electric apparatus can be provided with a DC/DC converter that converts the output voltage Vout of the power supply device 1 or 1*a* into another direct-current voltage. The electric apparatus may be a household electric appliance such as a lighting apparatus or a television receiver or may be an industrial apparatus.

The transistor M0 as a switching element can also be formed by a junction FET, an insulated gate bipolar transistor (IGBT), or a bipolar transistor.

The embodiment of the present disclosure can be modified in various manners as appropriate within the scope of technical ideas of the appended claims. The above embodiment is merely an example of embodiments of the present disclosure, and the meanings of terms of the present disclosure or each constituent element are not limited to those described in the above embodiment. Specific numerical values used in the foregoing descriptive sentences are merely illustrative, and needless to say, the numerical values can be changed to various numerical values.

What is claimed is:

1. A semiconductor device for a non-isolated buck converter, the semiconductor device comprising:
    a first terminal connected to an input wiring to which an input voltage having a first ground potential as a reference is applied;
    a second terminal connected to one terminal of an inductor;
    a switching element disposed between the first terminal and the second terminal;
    a smoothing capacitor disposed between an output wiring and a conductive portion, wherein the conductive portion has the first ground potential; and
    a control circuit configured to control an output voltage in the output wiring to which another terminal of the inductor is connected and the smoothing capacitor is connected, by controlling an inductor current flowing through the inductor through switching control of the switching element, wherein
    the semiconductor device is operating with a second ground potential corresponding to a potential of the second terminal as a reference, and
    the control circuit includes a protecting circuit, wherein the protecting circuit is configured to:
        refer to a first evaluation voltage corresponding to a voltage between the first terminal and the second terminal at a sampling timing at which a first predetermined period of time has passed from turning off of the switching element;
        perform a protecting operation that fixes the switching element to an off state, when an overvoltage state in which the first evaluation voltage exceeding a predetermined upper side determination voltage continues for at least a second predetermined period of an upper side determination time; and
        perform the protecting operation when a low voltage state in which the first evaluation voltage is below a predetermined lower side determination voltage continues for at least a third predetermined period of a lower side determination time.

2. The semiconductor device for the non-isolated buck converter according to claim 1, wherein
the inductor current flows from the input wiring through the switching element and the inductor to the output wiring, and
the non-isolated buck converter includes a freewheeling element configured to guide the inductor current in an off interval of the switching element to the output wiring.

3. The semiconductor device for the non-isolated buck converter according to claim 2, wherein a part of an energy stored in the inductor in an on interval of the switching element remains in the inductor at the sampling timing.

4. The semiconductor device for the non-isolated buck converter according to claim 2, wherein the inductor current produced in an on interval of the switching element remains at the sampling timing.

5. The semiconductor device for the non-isolated buck converter according to claim 1, wherein
the protecting circuit includes a voltage dividing circuit,
the voltage dividing circuit is configured to divide the input voltage with the second ground potential as the reference,
the first evaluation voltage is obtained through voltage division in the voltage dividing circuit,
the voltage dividing circuit is integrated on a semiconductor substrate including silicon, and
each voltage dividing resistance constituting the voltage dividing circuit is formed by using the silicon within the semiconductor substrate.

6. The semiconductor device for the non-isolated buck converter according to claim 1, further comprising a starting circuit, wherein
the control circuit is further configured to:
start an operation on a power supply voltage based on one of an output of the starting circuit or the output voltage from the output wiring; and
stop the operation on the power supply voltage in a reset state in which the power supply voltage is below a predetermined reset voltage,
the starting circuit starts the control circuit by raising the power supply voltage based on the input voltage in the first terminal with the reset state, and
the power supply voltage is generated based on the output voltage after the control circuit is started.

7. The semiconductor device for the non-isolated buck converter according to claim 6, wherein
the protecting operation is performed with a state in which the power supply voltage is generated based on the output voltage after the starting of the control circuit,
when the power supply voltage consequently falls below the predetermined reset voltage through a decrease in the output voltage, the protecting operation is canceled with a stop of the control circuit, and
when the starting circuit subsequently raises the power supply voltage, the control circuit is restarted, and switching of the switching element is resumed.

8. The semiconductor device for the non-isolated buck converter according to claim 6, wherein
the protecting operation is performed with a state in which the power supply voltage is generated based on the output voltage after the starting of the control circuit, and
when the power supply voltage consequently decreases through a decrease in the output voltage, the starting circuit holds the power supply voltage higher than the predetermined reset voltage based on the input voltage at the first terminal, and
when a fourth predetermined period of standby time passes from a start of the protecting operation, the control circuit is further configured to:
perform a test processing that temporarily switches the switching element against the protecting operation; and
one of continue or cancel the protecting operation of the protecting circuit based on the first evaluation voltage in the test processing.

9. The semiconductor device for the non-isolated buck converter according to claim 8, wherein
the protecting operation is performed with a state in which the power supply voltage is generated based on the output voltage after the starting of the control circuit,
when the power supply voltage consequently decreases through a decrease in the output voltage, the starting circuit holds the power supply voltage higher than the predetermined reset voltage based on the input voltage at the first terminal, and
when the switching element is fixed to the off state by the protecting operation, the control circuit is further configured to:
refer to a second evaluation voltage corresponding to the voltage between the first terminal and the second terminal; and
one of continue or cancel the protecting operation of the protecting circuit based on the second evaluation voltage.

10. A non-isolated buck converter for generating an output voltage having a first ground potential as a first reference from an input voltage having the first ground potential as a second reference, the non-isolated buck converter comprising:
an input wiring to which the input voltage is applied;
an output wiring to which the output voltage is applied;
a semiconductor device, wherein the semiconductor device comprises:
a first terminal connected to the input wiring to which the input voltage having the first ground potential as the first reference is applied;
a second terminal connected to one terminal of an inductor;
a switching element disposed between the first terminal and the second terminal; and
a control circuit configured to control the output voltage in the output wiring to which another terminal of the inductor is connected and a smoothing capacitor is connected, by controlling an inductor current flowing through the inductor through switching control of the switching element, wherein
the semiconductor device is operating with a second ground potential corresponding to a potential of the second terminal as a third reference, and
the control circuit includes a protecting circuit, wherein the protecting circuit is configured to:
refer to a first evaluation voltage corresponding to a voltage between the first terminal and the second terminal at a sampling timing at which a first predetermined period of time has passed from turning off of the switching element;
perform a protecting operation that fixes the switching element to an off state, when an overvoltage state in which the first evaluation voltage exceeding a predetermined upper side determination voltage continues for at least a second predetermined period of an upper side determination time; and perform the protecting operation when a low voltage state in which the first evaluation voltage is below a predetermined lower side determination voltage continues for at least a third predetermined period of a lower side determination time;

the inductor disposed between the output wiring and the second terminal in the semiconductor device; and the smoothing capacitor disposed between the output wiring and a conductive portion having the first ground potential.

11. A power supply device, comprising:
a rectifying circuit configured to subject an alternating-current voltage to a full-wave rectification process;
a smoothing circuit configured to:
  subject the alternating-current voltage after the full-wave rectification process to a smoothing process; and
  output a voltage based on the smoothing process; and
a non-isolated buck converter, wherein
the non-isolated buck converter is configured to receive the outputted voltage from the smoothing circuit as an input voltage,
the non-isolated buck converter is configured to generate an output voltage having a first ground potential as a first reference from the input voltage having the first ground potential as a second reference, and
the non-isolated buck converter comprises:
  a semiconductor device comprising:
    a first terminal connected to an input wiring to which the input voltage having the first ground potential as the first reference is applied;
    a second terminal connected to one terminal of an inductor;
    a switching element disposed between the first terminal and the second terminal; and
    a control circuit configured to control the output voltage in an output wiring to which another terminal of the inductor is connected and a smoothing capacitor is connected, by controlling an inductor current flowing through the inductor through switching control of the switching element, wherein
    the semiconductor device is operating with a second ground potential corresponding to a potential of the second terminal as a third reference, and
    the control circuit includes a protecting circuit, wherein the protecting circuit is configured to:
      refer to a first evaluation voltage corresponding to a voltage between the first terminal and the second terminal at a sampling timing at which a first predetermined period of time has passed from turning off of the switching element;
      perform a protecting operation that fixes the switching element to an off state, when an overvoltage state in which the first evaluation voltage exceeding a predetermined upper side determination voltage continues for at least a second predetermined period of an upper side determination time; and
      perform the protecting operation when a low voltage state in which the first evaluation voltage is below a predetermined lower side determination voltage continues for at least a third predetermined period of a lower side determination time;
    the inductor disposed between the output wiring and the second terminal in the semiconductor device; and
    the smoothing capacitor disposed between the output wiring and a conductive portion having the first ground potential.

* * * * *